Feb. 19, 1957  G. B. LONG  2,782,292
DOMESTIC APPLIANCE
Filed April 17, 1952  2 Sheets-Sheet 1
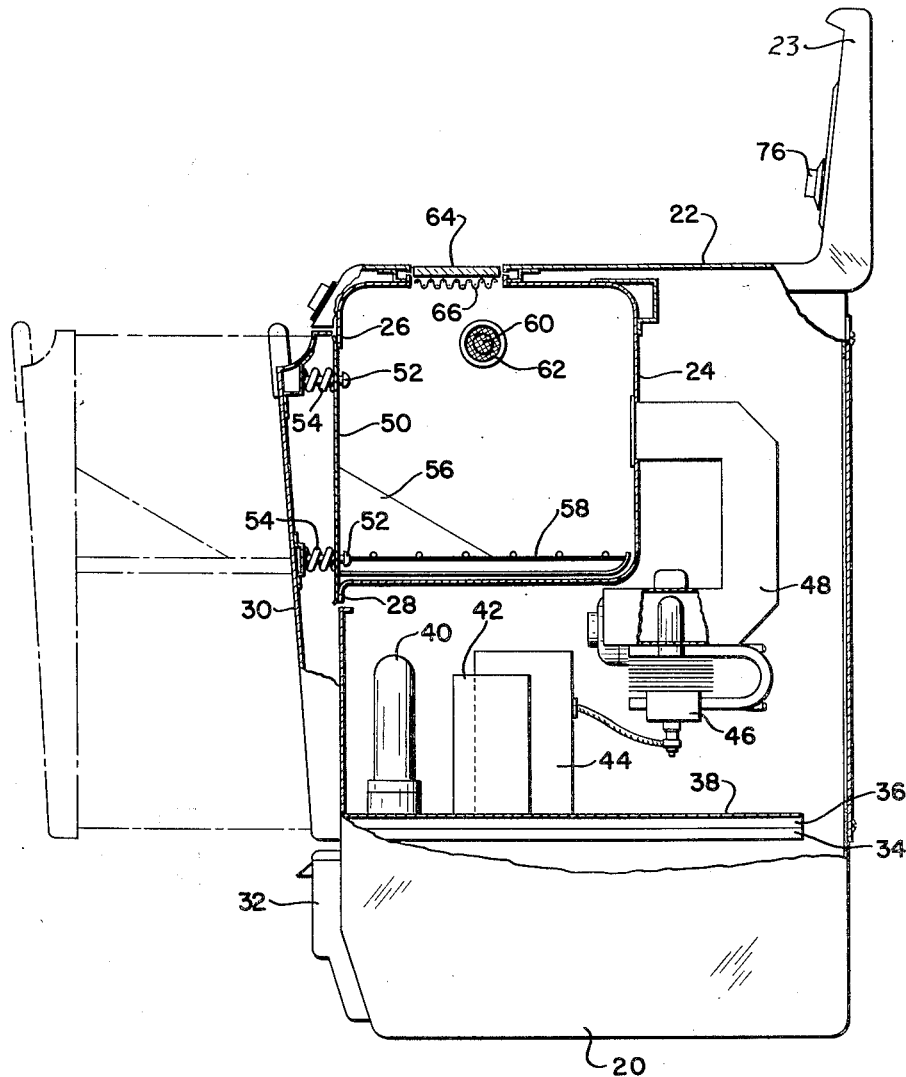
Fig. 1
Fig. 2
INVENTOR.
George B. Long
BY
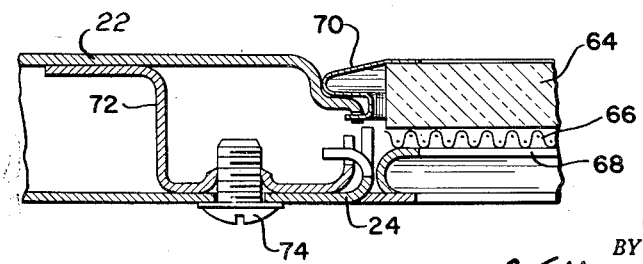
attorneys INVENTOR.
George B. Long United States Patent Office 2,782,292
Patented Feb. 19, 1957

2,782,292

DOMESTIC APPLIANCE

George B. Long, Dayton, Ohio, assignor to General Motors Corporation, Dayton, Ohio, a corporation of Delaware Application April 17, 1952, Serial No. 282,867

4 Claims. (Cl. 219—35)

This invention relates to a domestic appliance and more particularly to domestic electric ranges.

In the present styles of domestic electric ranges, it is necessary to open the oven door toward you and stoop down to observe the progress of the baking or broiling operations or to insert or remove food from the oven. At present, domestic ranges provide only for conventional cooking operations.

An object of my invention is to provide an electric range of the prevailing style having suitable arrangements for electronic cooking as well as conventional cooking.

It is another object of my invention to provide a simple arrangement by which when the front door is opened the food supporting rack is pulled out horizontally carrying the food, if any, out of the oven so that it is completely opened to view and fully accessible without stooping.

It is another object of my invention to provide an oven rack arrangement by which food containers may be removed according to the cook's choice by lifting directly vertically or horizontally in two directions or by a combined vertical or horizontal movement in either of two directions.

It is another object of my invention to provide a suitable door arrangement for an electronic oven which will prevent the escape of radiant energy and yet be in conformity to the present styling of ranges.

It is another object of my invention to provide an oven arrangement by which the progress of cooking in the oven can be observed without stooping and without opening the oven.

These objects are attained by providing a domestic electric range in which an electronic oven and a conventional oven are placed side-by-side. The electronic oven is provided with a suitably sealed top window for directly viewing the progress of the electronic cooking without stooping. The door of each oven opens like the front of a drawer. In each of the ovens the rack supporting the food is connected to and at least partially or wholly supported on the door. Provisions are made for supporting the racks at different heights if desired. The wave generator for the electronic oven is placed beneath the oven and the waves are transmitted to the oven by a suitable wave guide. The door for the electronic oven is provided with an inner spring mounted metal panel covering the entire opening of the oven and fitting tightly against the perimeter thereof to prevent the escape of radio waves from the oven.

Further objects and advantages of the present invention will be apparent from the following description, reference being had to the accompanying drawings, wherein a preferred form of the present invention is clearly shown.

In the drawings:

Figure 1 is a side view partly in section of a domestic electric range disclosing the electronic oven therein;

Figure 2 is an enlarged fragmentary view as showing the construction of the top window in the electronic oven.

Figure 3:
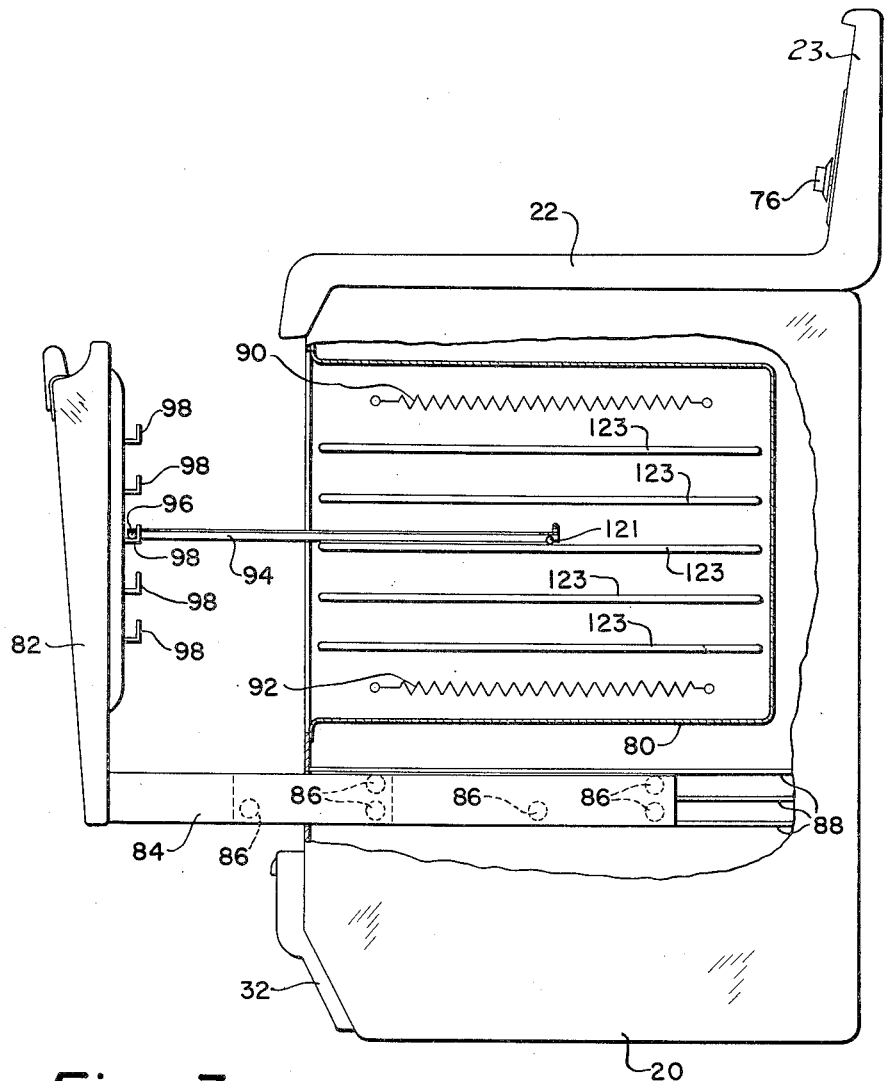
Figure 3 is a view of the same range with the conventional oven shown in section.

Referring now to the drawings, there is shown a domestic electric oven 20 having a top sheet metal surface 22 and a back panel 23. Beneath the top surface 22 on one side of the range 20 is a relatively small oven liner 24. This oven liner 24 has an opening at the front surrounded by suitable flanges 26 and 28 extending around its perimeter. The front of the range 20 is provided with large vertical matching doors on either side in conformity to present range styling. As shown in Figure 1, the door 30 for the electric oven extends from the bottom of the front edge of the top surface member 22 almost to the storage drawer 32 which extends completely across the bottom of the range 20. The door 30 is connected directly to a horizontally guided support means 34 which is guided horizontally by the horizontal guide 36 beneath the shelf 38. The shelf 38 supports the electronic oscillator apparatus which includes a row of at least four rectifier tubes 40, a filament transformer 42 and a plate transformer 44 which is connected to the magnetron oscillator tube designated by the reference character 46. The magnetron oscillator tube 46 extends into the lower portion of a wave guide 48, the upper portion of which extends through an aperture in the central portion of the rear wall of the oven liner 24 and opens directly into the interior of the oven compartment.

The wave guide 48 is closed at its lower end so that all the waves will be transmitted through the wave guide guide 48 into the interior of the oven. It is necessary to insure that the waves do not escape from the oven. For this reason the door 30 is provided with an inner spring mounted imperforate metal panel 50 mounted upon four pins 52 projecting inwardly from the outer framework of the door 30. The panel 50 is loosely mounted upon these pins. Within the door there is mounted upon the pins 52 four compression type coil springs 54 which normally tend to expand to urge the plate 50 into firm sealing engagement with the flanges 26 and 28. Attached to this panel 50 by a cantilever arrangement including gusset plates 56 on either side is a food supporting rack 58 which is located in the extreme bottom of the oven compartment when the door 30 is in closed position. The oven liner is provided with an illuminating light 60 at one side which illuminates the interior of the oven. To prevent the loss of radiant energy from the oven through the light socket there is provided over the light 60 a suitable metal screen 62.

In the top surface of the oven 32, there is provided a window 64 for viewing the progress of the electronic cooking of the food upon the rack 58 within the oven liner 24. This window 64 rests upon a metal screen 66 which prevents the escape of radiant energy through the glass. The edges of this metal screen 66 rests upon a shoulder 68. A suitable flange 70 extending around the rim of the glass 64 engages and holds the glass 64 in engagement with the screen 66 which rests upon the shoulder 68. The top support 22 is provided with a suitable brace 72 extending around the opening for the window 64. It is fastened in place by a plurality of screws 74. The electronic oscillator preferably generates radio frequency waves of 2450 megacycles or more. This provides very rapid cooking of the food upon the rack 58 so that it is desirable that the operation may be carefully watched. Obviously, with this type of cooking it would not be practical and in fact it would be dangerous to open the door 30 while cooking was in progress to observe the progress of the cooking. The very convenient window 64 makes viewing from the outside comparatively easy. A knob 76 may be provided upon the back panel 23 to control the electronic cooking.

With support provided by the horizontially guided support means 34 and its guide 36, the door 30 and the rack 58 may be pulled out directly horizontally with the door 30 moving like the front of the drawer. The rack 58 is then fully accessible from the top or both sides. The electronic oven can cook foods for a direct use on the table as the conventional oven is generally used. However, it is also especially suitable for some other uses which cannot be so well accomplished in the conventional oven. For example, the electronic oven can very readily be used to inactivate the enzymes present in food prior to the storage of food in a freezer. It has been found that only a negligible amount of vitamins are lost by the type of blanching whereas losses of 30% to 40% in some vitamins are common in steam and water blanching.

It is often desired to cook some foods electronically while other foods are being prepared in a conventional type oven. For this purpose the range 20 has a second oven liner 80 located beneath the top surface 22. This second liner 80 is adapted to have its open front closed by an oven door 82, the outer surface of which matches the outer surface of the door 30. These are located side-by-side and provide a symmetrical front for the cabinet 20. The door 82 is provided with an integral horizontally guided support means 84 located beneath the oven. It is provided with rollers 86 located as shown in Figure 3 which engage the horizontal guide means 88 fixed within the range beneath the oven liner 80.

The oven liner 80 may be provided with an upper oven heating unit 90 suitable for broiling and a lower oven heating unit 92 suitable for baking, preferably with a small amount of heat from the top unit 90. This oven is provided with at least one food supporting rack 94. The front part of the rack 94 has a transverse member 96 which will fit any one of the five hooked shaped supports 98 provided in vertically spaced relation upon the inner face of the door 82. The rear edge of the rack 94 is provided with a transverse member 121, the opposite ends of which are adapted to rest upon any one of the five vertically spaced ledges 123 provided upon the opposite side of the liner 80. These ledges 123 are matched for height with the hooked shaped supports 98 upon the door so that the rack 94 may be kept level at all times. The rack 94 in any of its vertical positions is freely accessible by pulling out the door 82. In this position the rack is freely accessible from the top of both sides of the rack. Additional racks similar to the rack 94 may be provided if more than one shelf is desired. With such a combined range, the advantages of both electronic cooking and conventional cooking are obtained with the greatest convenience in a setting of present day styling.

While the form of embodiment of the invention as herein disclosed constitutes a preferred form, it is to be understood that other forms might be adopted as may come within the scope of the claims which follow.

What is claimed is as follows:

1. In combination an electronic oven including an outer enclosure having a front opening, a box-shaped oven liner having a front opening registering with said enclosure front opening, a high frequency generator associated with said oven liner for feeding said oven liner with high frequency energy, a horizontally slidable door for closing said front opening, guide means disposed wholly outside of said oven liner for guiding said door in its horizontal movement to and from a closed position, and a flat metal plate secured to the front of said door and engaging the walls surrounding the oven liner opening when said door is closed, said metal plate closing said oven liner opening and being resiliently biased into tight engagement with the walls surrounding said oven liner opening for preventing arcing between said oven liner and metal plate.

2. In combination an electronic oven including an outer enclosure having a front opening, a box-shaped oven liner having a front opening registering with said enclosure front opening, a high frequency generator associated with said oven liner for feeding said oven liner with high frequency energy, a horizontally slidable door for closing said front opening, guide means disposed wholly outside of said oven liner for guiding said door in its horizontal movement to and from a closed position, a flat metal plate secured to the front of said door and engaging the walls surrounding the oven liner opening when said door is closed, said metal plate closing said oven liner opening and being resiliently biased into tight engagement with the walls surrounding said oven liner opening for preventing arcing between said oven liner and metal plate, a viewing opening in said outer enclosure registering with a second viewing opening formed in said oven liner, and means extending across said viewing openings for preventing the escape of high frequency energy from within said oven liner through said viewing openings.

3. In combination an electronic oven including an outer enclosure having a front opening, a box-shaped oven liner having a front opening registering with said enclosure front opening, a high frequency generator associated with said oven liner for feeding said oven liner with high frequency energy, a horizontally slidable door for closing said front opening, guide means disposed wholly outside of said oven liner for guiding said door in its horizontal movement to and from a closed position, a flat metal plate secured to the front of said door and engaging the walls surrounding the oven liner opening when said door is closed, said metal plate closing said oven liner opening and being resiliently biased into tight engagement with the walls surrounding said oven liner opening for preventing arcing between said oven liner and metal plate, a viewing opening in said outer enclosure registering with a second viewing opening formed in said oven liner, and a member having a plurality of closely spaced perforations extending across said viewing openings for preventing the escape of high frequency energy from within said oven liner through said viewing openings.

4. In combination an electronic oven including an outer enclosure having a front opening, a box-shaped oven liner having a front opening registering with said enclosure front opening, a high frequency generator associated with said oven liner for feeding said oven liner with high frequency energy, a horizontally slidable door for closing said front opening, guide means disposed wholly outside of said oven liner for guiding said door in its horizontal movement to and from a closed position, a flat metal plate secured to the front of said door and engaging the walls surrounding the oven liner opening when said door is closed, said metal plate closing said oven liner opening and being resiliently biased into tight engagement with the walls surrounding said oven liner opening for preventing arcing between said oven liner and metal plate, a viewing opening in said outer enclosure registering with a second viewing opening formed in said oven liner, a transparent plate extending across said viewing openings, and a screen extending across said viewing openings for preventing the escape of high frequency energy from within said oven liner through said viewing openings.

References Cited in the file of this patent

UNITED STATES PATENTS

| | | |
|---|---|---|
| 1,341,994 | Nelson | June 1, 1920 |
| 1,708,455 | Tinnerman | Apr. 9, 1929 |
| 1,717,636 | Vastine | June 18, 1929 |
| 2,116,854 | Teller et al. | May 10, 1938 |
| 2,133,639 | Smith et al. | Oct. 18, 1938 |
| 2,526,226 | Gross | Oct. 17, 1950 |
| 2,599,033 | Wild | June 3, 1952 |
| 2,687,125 | Sherman | Aug. 24, 1954 |